(12) United States Patent
Brdiczka et al.

(10) Patent No.: US 11,948,566 B2
(45) Date of Patent: Apr. 2, 2024

(54) EXTENSIBLE SEARCH, CONTENT, AND DIALOG MANAGEMENT SYSTEM WITH HUMAN-IN-THE-LOOP CURATION

(71) Applicant: ADOBE INC., San Jose, CA (US)

(72) Inventors: Oliver Brdiczka, San Jose, CA (US); Kyoung Tak Kim, San Ramon, CA (US); Charat Maheshwari, Fremont, CA (US)

(73) Assignee: ADOBE INC., San Jose, CA (US)

( * ) Notice: Subject to any disclaimer, the term of this patent is extended or adjusted under 35 U.S.C. 154(b) by 163 days.

(21) Appl. No.: 17/211,392

(22) Filed: Mar. 24, 2021

(65) Prior Publication Data

US 2022/0310084 A1 Sep. 29, 2022

(51) Int. Cl.
*G10L 15/22* (2006.01)
*G06F 16/242* (2019.01)
(Continued)

(52) U.S. Cl.
CPC ............ *G10L 15/22* (2013.01); *G06F 16/243* (2019.01); *G06F 16/24539* (2019.01);
(Continued)

(58) Field of Classification Search
CPC ....... G10L 15/22; G10L 15/063; G10L 15/18; G10L 2015/227; G06F 16/243;
(Continued)

(56) References Cited

U.S. PATENT DOCUMENTS 10,866,950 B2 * 12/2020 Sabripour ............ G06Q 50/265
2015/0340033 A1 * 11/2015 Di Fabbrizio .......... G10L 15/18
704/254

(Continued)

FOREIGN PATENT DOCUMENTS

CN 111400473 A * 7/2020 ............ G06F 11/321
WO WO-2019085236 A1 * 5/2019 ........... G06F 16/951
(Continued)

OTHER PUBLICATIONS

Sree Harsha Totakura, S Venkata Nagendra, Rohit Indukuri, V Vijayasherly, COS: A Frame Work for Clustered off-line Search, 2008, IEEE, pp. 569-573 (Year: 2008).*
(Continued)

*Primary Examiner* — Richemond Dorvil
*Assistant Examiner* — Nadira Sultana
(74) *Attorney, Agent, or Firm* — F. CHAU & ASSOCIATES, LLC

(57) ABSTRACT

The present disclosure describes systems and methods for extensible search, content, and dialog management. Embodiments of the present disclosure provide a dialog system with a trained intent recognition model (e.g., a deep learning model) to receive and understand a natural language query from a user. In cases where intent is not identified for a received query, the dialog system generates one or more candidate responses that may be refined (e.g., using human-in-the-loop curation) to generate a response. The intent recognition model may be updated (e.g., retrained) the accordingly. Upon receiving a subsequent query with similar intent, the dialog system may identify the intent using the updated intent recognition model.

20 Claims, 9 Drawing Sheets

(51) Int. Cl.
*G06F 16/2453* (2019.01)
*G06F 16/248* (2019.01)
*G10L 15/06* (2013.01)
*G10L 15/18* (2013.01)

(52) U.S. Cl.
CPC .......... *G06F 16/248* (2019.01); *G10L 15/063* (2013.01); *G10L 15/18* (2013.01); *G10L 2015/227* (2013.01)

(58) Field of Classification Search
CPC ............. G06F 16/24539; G06F 16/248; G06F 16/3329; G06F 16/2425; G06N 3/08
See application file for complete search history.

(56) References Cited

U.S. PATENT DOCUMENTS

| | | | | |
|---|---|---|---|---|
| 2018/0131765 A1* | 5/2018 | Puleston | | H04L 67/1097 |
| 2018/0342243 A1* | 11/2018 | VanBlon | | G06F 3/167 |
| 2020/0251091 A1* | 8/2020 | Zhao | | G06N 5/022 |
| 2021/0073293 A1* | 3/2021 | Fenton | | H04L 51/08 |
| 2021/0225357 A1* | 7/2021 | Zhao | | G10L 13/027 |
| 2022/0050972 A1* | 2/2022 | Usov | | G06F 40/295 |

FOREIGN PATENT DOCUMENTS

| | | | | |
|---|---|---|---|---|
| WO | WO-2019180515 A1 * | 9/2019 | ........... | G06F 11/321 |
| WO | 2019242483 | 12/2019 | | |
| WO | WO-2019242483 A1 * | 12/2019 | ........... | G06K 9/6256 |
| WO | WO-2021185326 A1 * | 9/2021 | ........... | G06F 16/951 |

OTHER PUBLICATIONS

Co-pending U.S. Appl. No. 17/069,637, filed Oct. 13, 2020.
Examination Report dated Aug. 31, 2023 in related United Kingdom Patent Application No. GB2200527.6 (8 pages).

* cited by examiner

EXTENSIBLE SEARCH, CONTENT, AND DIALOG MANAGEMENT SYSTEM WITH HUMAN-IN-THE-LOOP CURATION

BACKGROUND

The following relates generally to dialog management, and more specifically to extensible search, content, and dialog management.

Dialog management refers to the operation of automated systems that dynamically interact with users using natural language. In many cases, dialog systems perform information retrieval tasks to obtain information from a knowledge base that is relevant to a dialog from a user. Information retrieval includes extracting information resources based on a query object (e.g., a question or search keywords). For example, a user or a dialog system can provide a text description as a query, and a search engine may find text descriptions, content, or other media (such as images) that are similar or relevant to the query.

In some cases, dialog systems may provide specific task-related output through conversation with a user. For instance, dialog systems can be used in an automated conversational agents, also known as assistants or chatbots, to simulate human conversation using natural language processing tasks. The workflow of such dialog systems may include processing user inputs (e.g., queries) using natural language understanding, dialog management, and natural language generation. Natural language understanding tasks include detecting the intent of user input to identify relevant search or conversational elements of the natural language query for subsequent dialog management and natural language generation tasks.

However, dialog systems are not always able to determine the intent of user input. For instance, user attempts to access information (e.g., from an automated conversational agent, from a database, etc.) using natural language commands may fail because the system does not find a correspondence between natural language expressions and database queries (e.g., and the dialog system may not recognize the intent of the user input natural language expression).

Therefore, there is a need in the art for improved systems and techniques for processing natural language queries for both increased user accessibility to data stored in a database as well as for increased utility or relevance of results accessed via such dialog systems.

SUMMARY

The present disclosure describes systems and methods for extensible search, content, and dialog management. Embodiments of the present disclosure provide a dialog system with a trained intent recognition model (e.g., a deep learning model) to receive and understand a natural language query from a user. In cases where intent is not identified for a received query, the dialog system generates one or more candidate responses that may be refined (e.g., using human-in-the-loop curation) to generate a response. The intent recognition model may be updated (e.g., retrained) the accordingly. Upon receiving a subsequent query with similar intent, the dialog system may identify the intent using the updated intent recognition model.

Accordingly a method, apparatus, non-transitory computer readable medium, and system for extensible search, content, and dialog management are described. One or more embodiments of the method, apparatus, non-transitory computer readable medium, and system include receiving a query, determining that an intent recognition model did not identify an intent tag for the query, transmitting query information based on the determination, receiving an updated intent recognition model comprising an updated intent tag corresponding to the query, receiving a subsequent query, determining that the subsequent query corresponds to the updated intent tag, identifying a response based on the updated intent tag, and providing the response for the subsequent query.

A method, apparatus, non-transitory computer readable medium, and system for extensible search, content, and dialog management are described. One or more embodiments of the method, apparatus, non-transitory computer readable medium, and system include receiving query information indicating that an intent recognition model did not identify an intent tag for a query, generating a response to the query based on the query information, updating the intent recognition model to include an updated intent tag corresponding to the query, and transmitting the response and the updated intent recognition model.

An apparatus, system, and method for extensible search, content, and dialog management are described. One or more embodiments of the apparatus, system, and method include an intent recognition model configured to identify an intent tag of a query, a content scripting engine configured to select response text for the query based on the intent tag, a dialog generation engine configured to generate a response based on query information indicating that intent recognition model did not identify the intent tag for the query, and a training model configured to update the intent recognition model and the content scripting engine.

DETAILED DESCRIPTION

Figure 1:
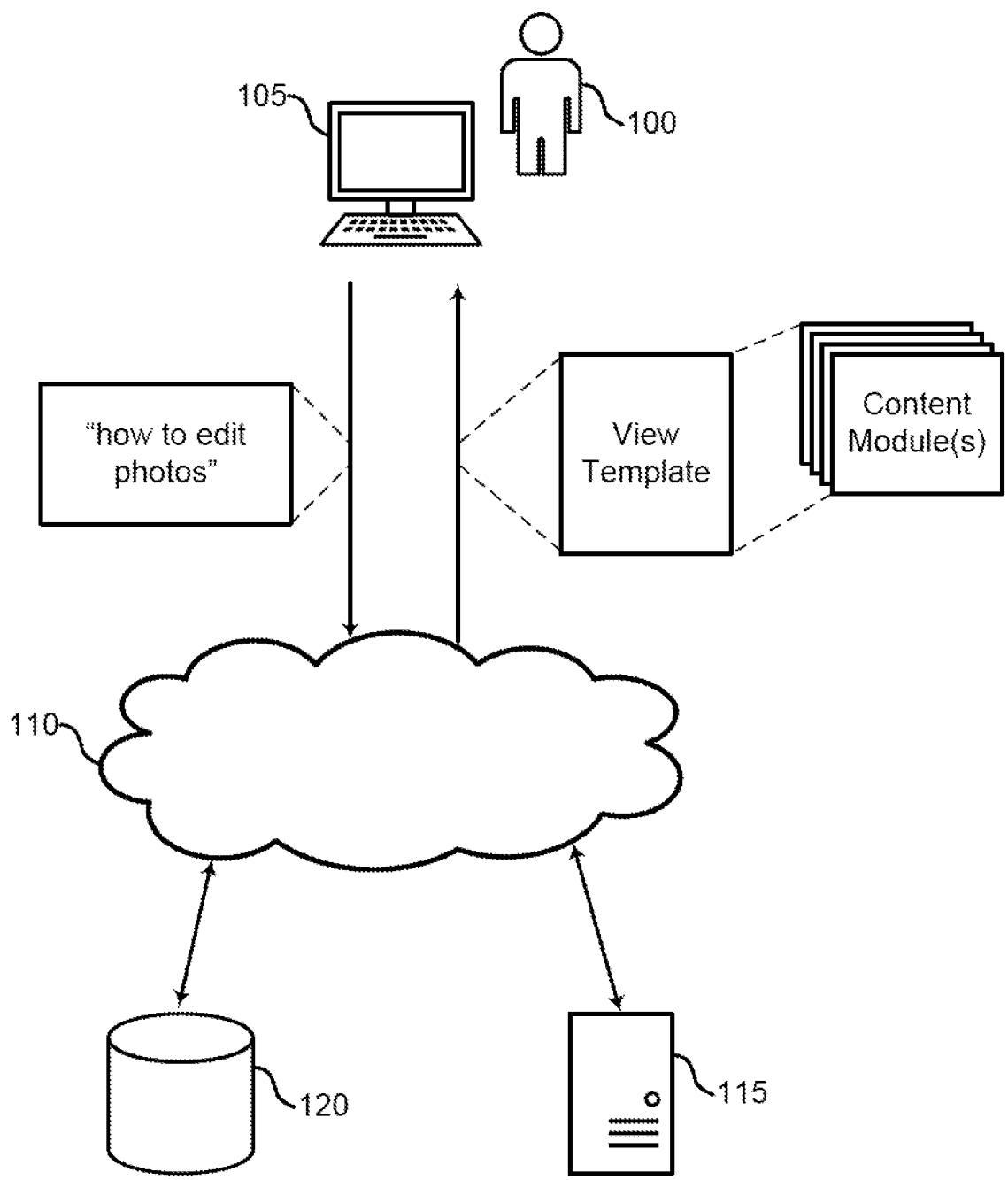
FIG. 1 shows an example of a search, content, and dialog management system according to aspects of the present disclosure.

The present disclosure describes systems and methods for extensible search, content, and dialog management. Embodiments of the present disclosure provide a dialog system with an intent recognition model (e.g., a deep learning model) to receive and understand a natural language query from a user. The intent recognition model is trained based on candidate responses, generated using a dialog generation engine, that are refined (e.g., via human-in-the-loop curation) and used to update the intent recognition model. Embodiments of the present disclosure further include implementing a content scripting engine to generate content scripts that include dialog models specifying user interaction in response to an intent and associated search queries and content. As a result, dialog systems can train an intent recognition model to map natural language queries to specific intent tags that map to certain types of responses. Such dialog systems increase the relevance and utility of results accessible by a user through natural language queries.

Dialog systems have been used in automated conversational agents (e.g., assistants or chatbots) to simulate human conversation using natural language processing tasks. However, in some cases, these systems do not find a correspondence between natural language expressions and database queries. Moreover, dialog systems may be unable to determine the intent of user input natural language queries, which may add further complexity to providing relevant or meaningful results. As a result, some user attempts to access information (e.g., from an automated conversational agent, from a database, etc.) using natural language commands may be handled poorly by such dialog systems.

According to techniques described herein, natural language intent, content scripts, and dialog models can be extended to natural language queries (e.g., natural language queries of unidentified intent) through automatic generation of candidate responses and, in some cases, human curation. For example, in cases where intent is not identified for a received query, a dialog system may generate one or more candidate responses that may be refined (e.g., using human-in-the-loop curation) to generate a curated response and to update (e.g., train) the intent recognition model. Further, content scripts including dialog models specifying user interaction are generated in response to intent tags. Therefore, upon receiving a subsequent query with similar intent, the dialog system may identify the intent for the subsequent query using the updated intent recognition model (e.g., using generated content scripts, updated intent tags, etc.).

By applying the unconventional step of recognizing when an intent is not identified and updating an intent recognition model, a dialog systems operating according to the techniques described herein may more efficiently determine user intent and provide improved information retrieval content. Accordingly, conversational features in embodiments described herein are extensible in that the techniques may generate content for new queries that do not have an identifiable correspondence to search content (e.g., queries with initially unidentifiable user intent).

In some embodiments, the dialog system does not provide an immediate curated response. However, human curation and updated intent recognition models may be leveraged to generate a subsequent response, which may include recommended natural language queries to intelligently guide the user down a refinement path. When the same query is asked again by the same user or by another user, the dialog system responds (e.g., immediately) with a curated response. Thus, commonly asked queries may be identified and the system may grow and evolve to meet the needs of the users.

Embodiments of the present disclosure may be used in the context of an information retrieval system. For example, a dialog system (e.g., an automated conversational agent) based on the present disclosure may take natural language text as a query and efficiently identify the intent of the query to find content relevant to the query. An example of an application of the inventive concept in the information retrieval context is provided with reference to FIGS. 1-3. Details regarding the architecture of an example user device are provided with reference to FIGS. 4 and 5. Details regarding the architecture of an example cloud server providing dialog curation are provided with reference to FIGS. 6-8. An example system operation is described with reference to FIG. 9.

Information Retrieval System

FIG. 1 shows an example of a search, content, and dialog management system according to aspects of the present disclosure. The example shown includes user 100, device 105, cloud 110, server 115, and database 120. A user 100 may access content (e.g., via a media guidance application) from one or more user equipment devices 105. A device 105 (e.g., a computing device) may include a personal computer, laptop computer, mainframe computer, palmtop computer, personal assistant, mobile device 105, or any other suitable processing apparatus. A user 100 may access server 115 via cloud 110. Device 105 is an example of, or includes aspects of, the corresponding element described with reference to FIGS. 4 and 9. Server 115 is an example of, or includes aspects of, the corresponding element described with reference to FIGS. 6 and 9. Database 120 is an example of, or includes aspects of, the corresponding element described with reference to FIGS. 4 and 6.

In accordance with aspects described herein, the system of FIG. 1 provides extensible search, content, and dialog management. User 100 may input a natural language query to device 105, and device 105 may transmit the natural language query (e.g., the natural language query may include "how to edit photos"). Server 115 may determine one or more content modules relevant to the natural language query (e.g., based on natural language understanding tasks, database 120 search tasks, dialog management tasks, and natural language generation tasks corresponding to the received natural language query). Server 115 may provide a view template in response to device 105 for display to user 100. The view template includes an arrangement of the one or more content modules (e.g., as further described herein, for example, with reference to FIG. 3).

For instance, in cases where intent is not identifiable by device 105 for a natural language text query input by user 100, server 115 may generate one or more candidate responses (e.g., via a dialog generation engine of server 115). The one or more candidate responses may be refined (e.g., using human-in-the-loop curation) to generate a curated response, as well as to update (e.g., train) an intent recognition model of device 105. Therefore, upon receiving a subsequent query with similar intent, device 105 may identify the intent for the subsequent query using the updated intent recognition model.

As used herein, a query may refer to a request for information (e.g., from software on device 105, from a database 120, from the Internet etc.). A query may thus include a natural language text question, one or more natural language text keywords for a search, etc. As described in more detail herein, in some embodiments a search, content, and dialog management system may first determine if a query is a question (e.g., via a question detection model) and subsequently determine whether an intent tag for the query is identified (e.g., via an intent recognition model). For instance, in some cases, if a query is determined to be one or more search keywords (e.g., and not a question), a search, content, and dialog management system may search for keyword correspondences between natural language search keywords and searchable content natural language keywords.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers 115. A server 115 is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A server 115 provides one or more functions to users 100 linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device, a personal computer, a laptop computer, a mainframe computer, a supercomputer, or any other suitable processing apparatus.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user 100 interaction.

Natural language processing refers to techniques for using computers to interpret natural language. In some cases, natural language processing tasks involve assigning annotation data such as grammatical information to words or phrases within a natural language expression. Different classes of machine-learning algorithms have been applied to natural language processing tasks. These algorithms may take a set of features generated from the natural language data as input. Some algorithms, such as decision trees, utilize hard if-then rules. Other systems use neural networks or statistical models which make soft, probabilistic decisions based on attaching real-valued weights to input features. These models can express the relative probability of multiple answers.

The present disclosure describes embodiments for on-device and in-cloud extensible dialog and content management that can be used with software (e.g., in new software or in addition to an existing software) as a feature. The approach is used to incorporate dialog and content updates to provide an intelligent framework (i.e., Contextual Intelligence Framework (CIF)). Embodiments described in the present disclosure may be embedded into a panel and provide an assistant-based functionality that can be employed within a software (e.g., Photoshop).

For instance, in-app and on-device software capabilities (e.g., Discover Panel or Unified Panel in Photoshop) retrieve search results through interfaces where users 100 may perform work. In some examples, the search capability can be transformed into an assistant-like feature to receive conversational responses and associated content, while maintaining (and augmenting the response with) the search capability. For example, users 100 can ask queries related to functionality aspects and dialog systems can retrieve relevant content (e.g., in the form of question answers, related information, tutorials, suggestions, etc.). The search and dialog work together such that the search results in response to a question may be curated and specific content be shown.

Conversational features in embodiments described herein are extensible (e.g., are applicable) to new queries the user 100 may ask (e.g., to never before asked questions, to questions with initially unidentifiable intent, to questions without exact correspondence to searchable content, etc.). While the system may not provide an immediate response (e.g., an immediate curated response to the new questions), the system may implement and leverage machine learning models and human curation, as described herein, to generate a response. When the same query (or, in some cases, a similar query) is asked again, the system responds with the curated response. The system may be designed to run on-device (e.g., with the capability to provide service without the user 100 having access to the internet).

Some dialog systems are limited to dialog only (e.g., dialog, content, and search are not blended). Search systems (e.g., on-line search engines) batch new or unknown queries for review or re-training. For example, a query may be submitted without a conversational answer several times and some search systems may always provide the same response. These systems also may not support offline mode (i.e., an operational mode running on device 105 without connection to a wireless network). In some systems, there may be no extensible human-in-the-loop dynamic update and no conversational answers.

According to aspects of the present disclosure, search results and content shown may be curated. Embodiments described herein provide a method and framework to blend search, content, and conversational interaction for an in-app learn, search and discovery experience, on-device and in-cloud, with the ability to extend the intent, content scripts and dialog models through automatic generation of answers and human curation.

Embodiments described herein provide example machine learning architectures (e.g., including an intent recognition model, a dialog model, etc.) that distinguish questions and search queries, as well as blend search results and conversational answers. Content scripts are generated which include dialog models specifying user 100 interaction in response to an intent and associated search queries and content. The framework extends the intent recognition models and dialog models for the conversational query answering, automatic generation of candidate responses, and human curation of the final responses. The framework further extends on-device updating of the models. The present disclosure provides a method for integrated search and conversational interaction experience for offline users 100.

Figure 2:
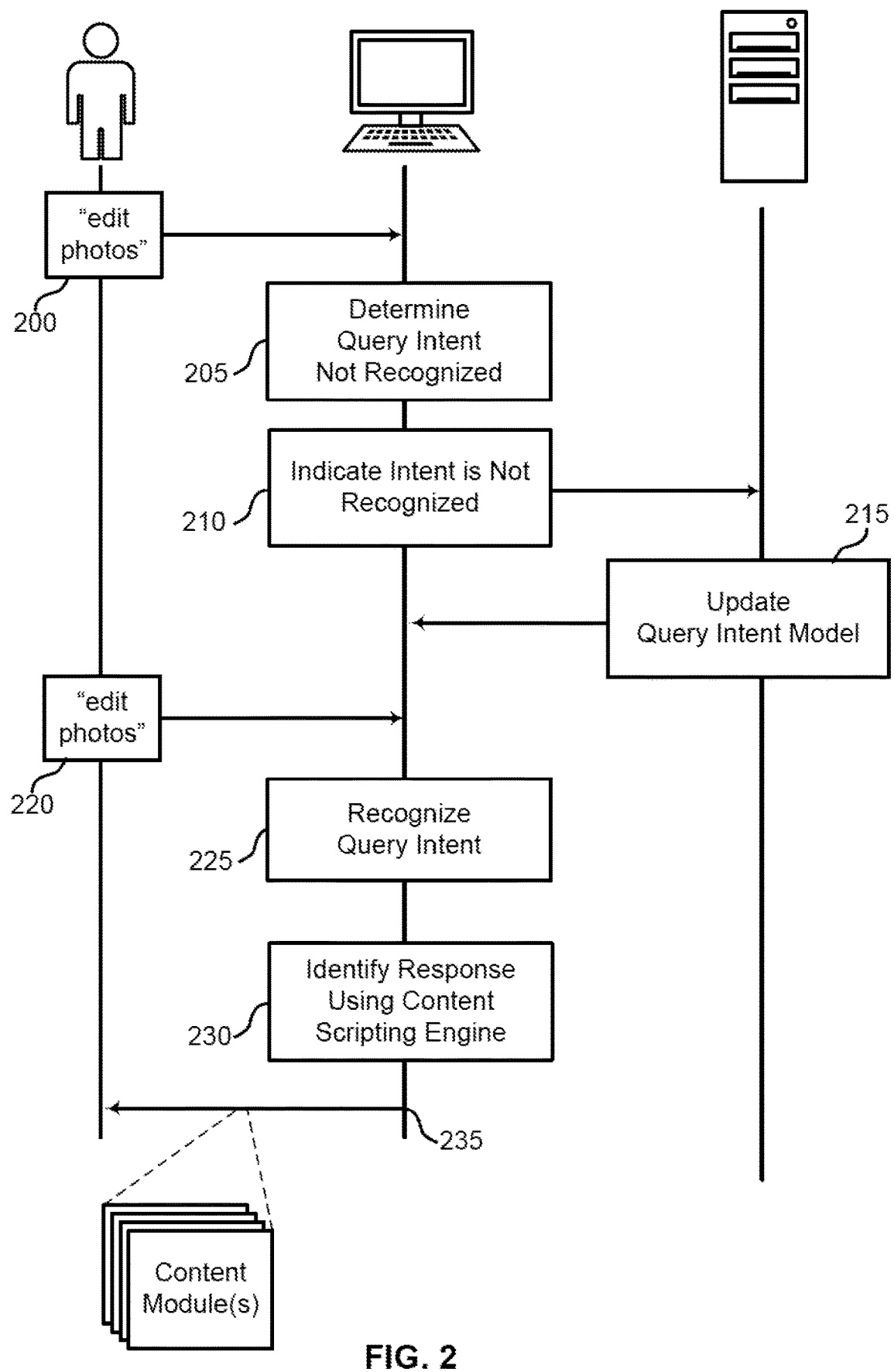
FIG. 2 shows an example of a process for extensible search, content, and dialog management according to aspects of the present disclosure.

FIG. 2 shows an example of a process for extensible search, content, and dialog management with human-in-the-loop curation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system receives a query. For instance, a user may input a query (e.g., a question, one or more search keywords, etc.) into a user device (e.g., via a device user interface). In some cases, the operations of this step refer to, or may be performed by, a question detection model as described with reference to FIGS. 4 and 9.

At operation 205, the system determines that an intent recognition model did not identify an intent tag for the query. In some cases, the operations of this step refer to, or may be performed by, an intent recognition model as described with reference to FIGS. 4, 6, and 9.

At operation 210, the device transmits query information to a server (e.g., a cloud server) based on the determination that the intent of the query is not identified. In some examples, the query information indicates that the device (e.g., the intent recognition model of the device) did not identify an intent tag for the query. In some cases, the operations of this step refer to, or may be performed by, a device as described with reference to FIGS. 1, 4, and 9.

At operation 215, the system receives (e.g., from the device) an updated intent recognition model including an updated intent tag corresponding to the query. In some cases, the operations of this step refer to, or may be performed by, a server or cloud as described with reference to FIGS. 1, 4, and 9.

At operation 220, the device receives a subsequent query. The subsequent query may be received by a same user (e.g., the same user as in operation 200) or from a different user. In some cases, the subsequent query may be referred to as a subsequent query with the same intent or similar intent as the initial query (e.g. the initial query received by the device at operation 200). In some cases, the operations of this step refer to, or may be performed by, a question detection model as described with reference to FIGS. 4 and 9.

At operation 225, the device determines that the subsequent query corresponds to the updated intent tag. In some cases, the operations of this step refer to, or may be performed by, an intent recognition model as described with reference to FIGS. 4, 6, and 9.

At operation 230, the device identifies a response based on the updated intent tag. In some cases, the response identified at operation 230 may be referred to as a curated response (e.g., a response curated via human-in-the-loop curation that may have resulted from operations 215). In some cases, the operations of this step refer to, or may be performed by, a content scripting engine as described with reference to FIGS. 4 and 9.

At operation 235, the device provides the response for the subsequent query. In some examples, operation 235 may include displaying a view template including one or more content modules identified at operation 230. In some cases, the operations of this step refer to, or may be performed by, a device as described with reference to FIGS. 1, 4, and 9.

Figure 3:
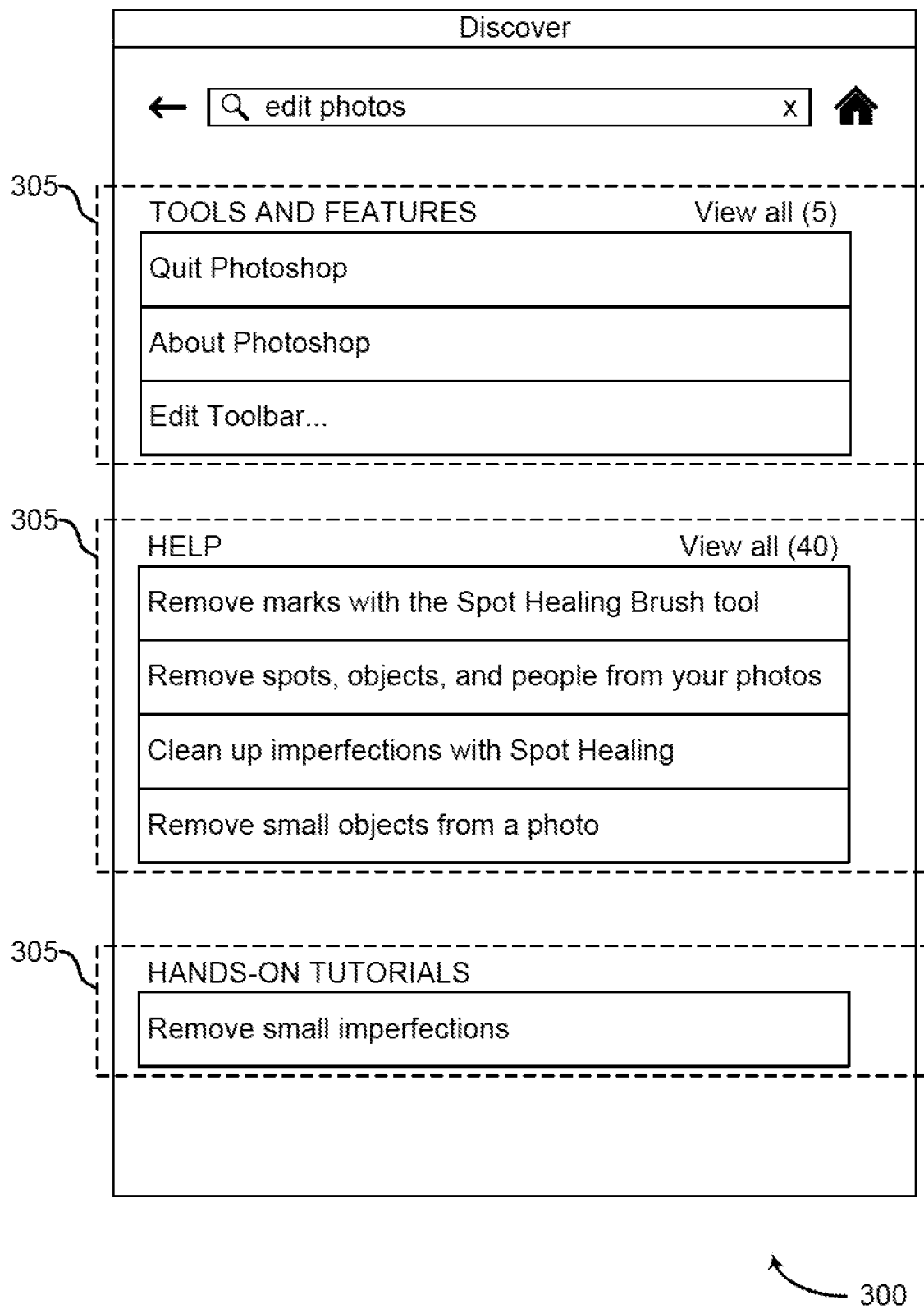
FIG. 3 shows an example of an example display according to aspects of the present disclosure.

FIG. 3 shows an example of an example display according to aspects of the present disclosure. For example, a view template 300 may be displayed, by a user device, to a user in response to a user query. In one embodiment, view template 300 includes content modules 305. As described herein, the present disclosure combines an intelligent framework within software. The framework may offer a search bar that enables users to run searches and interact with the software. Presently used in-app search frameworks are managed by content modules 305 (e.g., help content module, in-app-tutorial content module, and quick action content module). The content modules 305 are arranged by user-interface (UI) controllers using view templates 300 recommended by software embedded intelligent frameworks (e.g., CIF embedded in Discover Panel).

View templates 300 generally refer to how content types (e.g., types of content modules 305) are arranged. Content modules 305 are able to organize themselves (e.g., based on a view template 300). Content modules 305 may provide the actual content searched and provided by a search system. In the example of FIG. 3, content modules 305 include 'TOOLS AND FEATURES,' 'HELP,' and 'HAND-ON TUTORIALS.' Such is shown for illustrative purposes (e.g., based on the example query "edit photos"), and is not intended to limit the scope of the present disclosure. Other various content modules 305 may be searched and provided by a search system based on any user input query.

User Device

Figure 4:
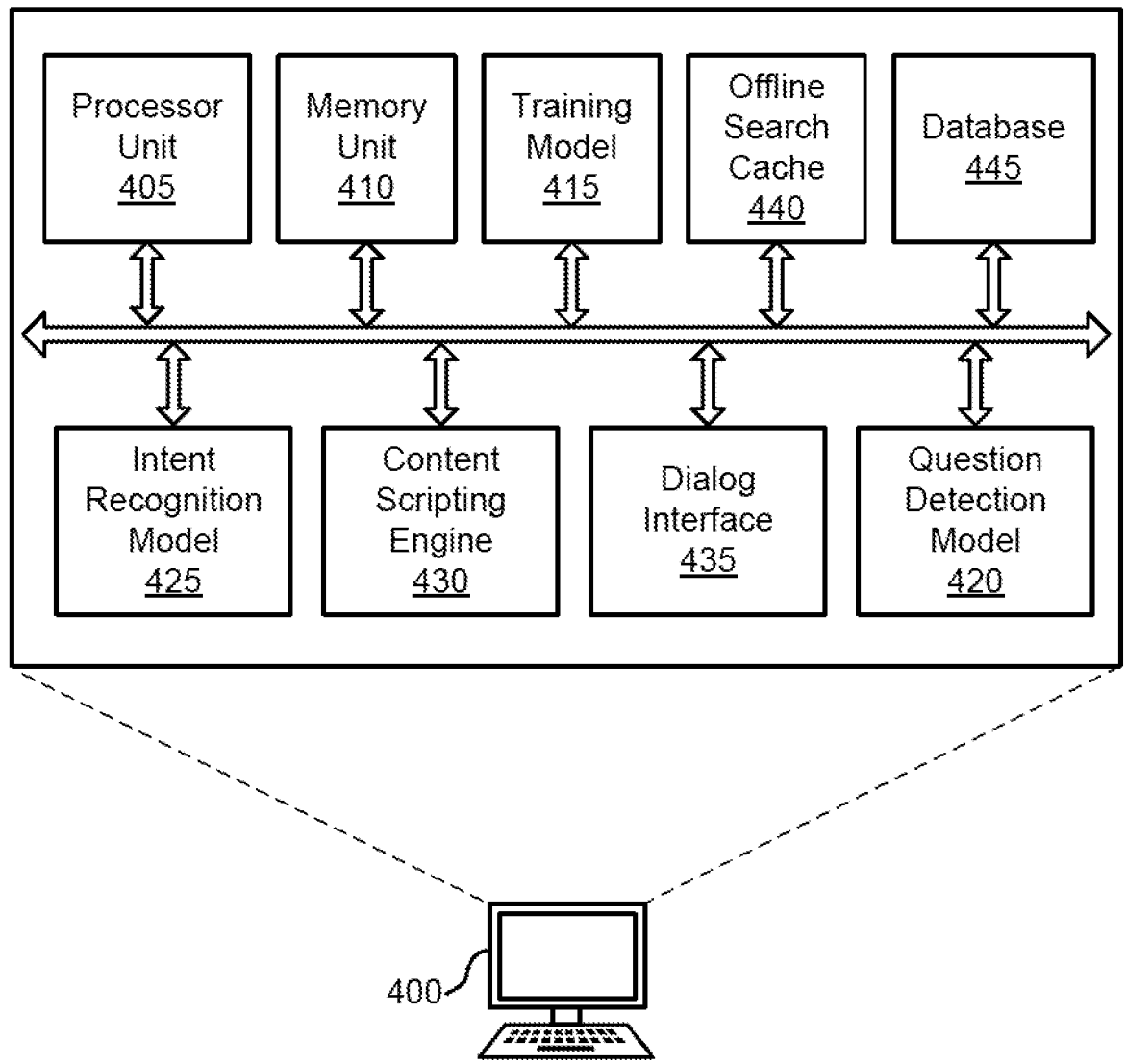
FIG. 4 shows an example of an example user device according to aspects of the present disclosure.

According to FIGS. 3 and 4, a method, apparatus, non-transitory computer readable medium, and system for extensible search, content, and dialog management are described. One or more embodiments of the method, apparatus, non-transitory computer readable medium, and system include receiving a query, determining that an intent recognition model did not identify an intent tag for the query, transmitting query information based on the determination, receiving an updated intent recognition model comprising an updated intent tag corresponding to the query, receiving a subsequent query, determining that the subsequent query corresponds to the updated intent tag, identifying a response based on the updated intent tag, and providing the response for the subsequent query.

Some examples of the method, apparatus, non-transitory computer readable medium, and system described above further include determining that the query comprises a question. Some examples of the method, apparatus, non-transitory computer readable medium, and system described above further include identifying a CIF for the subsequent query, wherein the response is based at least in part on the CIF.

Some examples of the method, apparatus, non-transitory computer readable medium, and system described above further include transmitting the subsequent query to an offline search cache. Some examples further include receiving cached results for the subsequent query, wherein the response is based at least in part on the cached results. Some examples of the method, apparatus, non-transitory computer readable medium, and system described above further include responding that an answer to the query is unknown.

FIG. 4 shows an example of an example user device 400 according to aspects of the present disclosure. Device 400 is an example of, or includes aspects of, the corresponding element described with reference to FIGS. 1 and 9. In one embodiment, device 400 includes processor unit 405, memory unit 410, training model 415, question detection model 420, intent recognition model 425, content scripting engine 430, dialog interface 435, offline search cache 440, and database 445. Although the apparatus of FIG. 4 is described in the context of a user device, it could also be located on a cloud-based server.

An apparatus for extensible search, content, and dialog management with human-in-the-loop curation is described.

One or more embodiments of the apparatus include an intent recognition model 425 configured to identify an intent tag of a query, a content scripting engine 430 configured to select response text for the query based on the intent tag, and a training model 415 configured to update the intent recognition model and the content scripting engine.

A processor unit 405 is an intelligent hardware device 400, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device 400, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions. In some embodiments, a processor unit 405 includes special purpose components for modem processing, baseband processing, digital signal processing, or transmission processing. Processor unit 405 is an example of, or includes aspects of, the corresponding element described with reference to FIG. 6.

Examples of a memory unit 410 include random access memory (RAM), read-only memory (ROM), or a hard disk. Examples of memory units 410 include solid state memory and a hard disk drive. In some examples, memory is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices 400. In some cases, a memory controller operates memory cells. For example, the memory controller can include a row decoder, column decoder, or both. In some cases, memory cells within a memory store information in the form of a logical state. Memory unit 410 is an example of, or includes aspects of, the corresponding element described with reference to FIG. 6.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An example of a neural network includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, training model 415 transmits the response and the updated intent recognition model 425. According to some embodiments, training model 415 is configured to update the intent recognition model 425 and the content scripting engine 430. According to some embodiments, training model 415, intent recognition model 425, and/or the content scripting engine 430 may implement one or more aspects of a neural network. Training model 415 is an example of, or includes aspects of, the corresponding element described with reference to FIG. 6.

According to some embodiments, question detection model 420 receives a query. In some examples, question detection model 420 receives a subsequent query. In some examples, question detection model 420 determines that the query includes a question. According to some embodiments, question detection model 420 receives the query from a user. In some examples, question detection model 420 receives a subsequent query. According to some embodiments, question detection model 420 is configured to determine whether the query comprises a question. Question detection model 420 is an example of, or includes aspects of, the corresponding element described with reference to FIG. 9.

According to some embodiments, intent recognition model 425 determines that an intent recognition model 425 did not identify an intent tag for the query. In some examples, intent recognition model 425 determines that the subsequent query corresponds to the updated intent tag. According to some embodiments, intent recognition model 425 attempts to detect the intent tag of the query using the intent recognition model 425. In some examples, intent recognition model 425 determines that the intent recognition model 425 did not identify the intent tag for the query. In some examples, intent recognition model 425 determines, using the updated intent recognition model 425, that the subsequent query corresponds to the updated intent tag.

According to some embodiments, device 400 transmits query information based on the determination. In some examples, device 400 receives an updated intent recognition model including an updated intent tag corresponding to the query. In some examples, device 400 provides the response for the subsequent query. In some examples, device 400 transmits the subsequent query to an offline search cache. According to some embodiments, device 400 transmits the query information based on the determination.

According to some embodiments, intent recognition model 425 is configured to identify an intent tag of a query. Intent recognition model 425 is an example of, or includes aspects of, the corresponding element described with reference to FIGS. 6 and 9.

According to some embodiments, content scripting engine 430 identifies a response based on the updated intent tag. According to some embodiments, content scripting engine 430 updates a content scripting engine 430 based on the response. According to some embodiments, content scripting engine 430 is configured to select response text for the query based on the intent tag. Content scripting engine 430 is an example of, or includes aspects of, the corresponding element described with reference to FIG. 9.

According to some embodiments, dialog interface 435 responds that an answer to the query is unknown. According to some embodiments, dialog interface 435 is configured to receive the query and to provide the response to a user. In some examples, the dialog interface 435 includes a set of sections corresponding to a set of content types. Dialog interface 435 is an example of, or includes aspects of, the corresponding element described with reference to FIG. 9.

According to some embodiments, offline search cache 440 receives cached results for the subsequent query, where the response is based on the cached results. According to some embodiments, offline search cache 440 is configured to provide offline search results based on the query. Offline search cache 440 is an example of, or includes aspects of, the corresponding element described with reference to FIG. 9.

Database 445 is an example of, or includes aspects of, the corresponding element described with reference to FIGS. 1 and 6.

Figure 5:
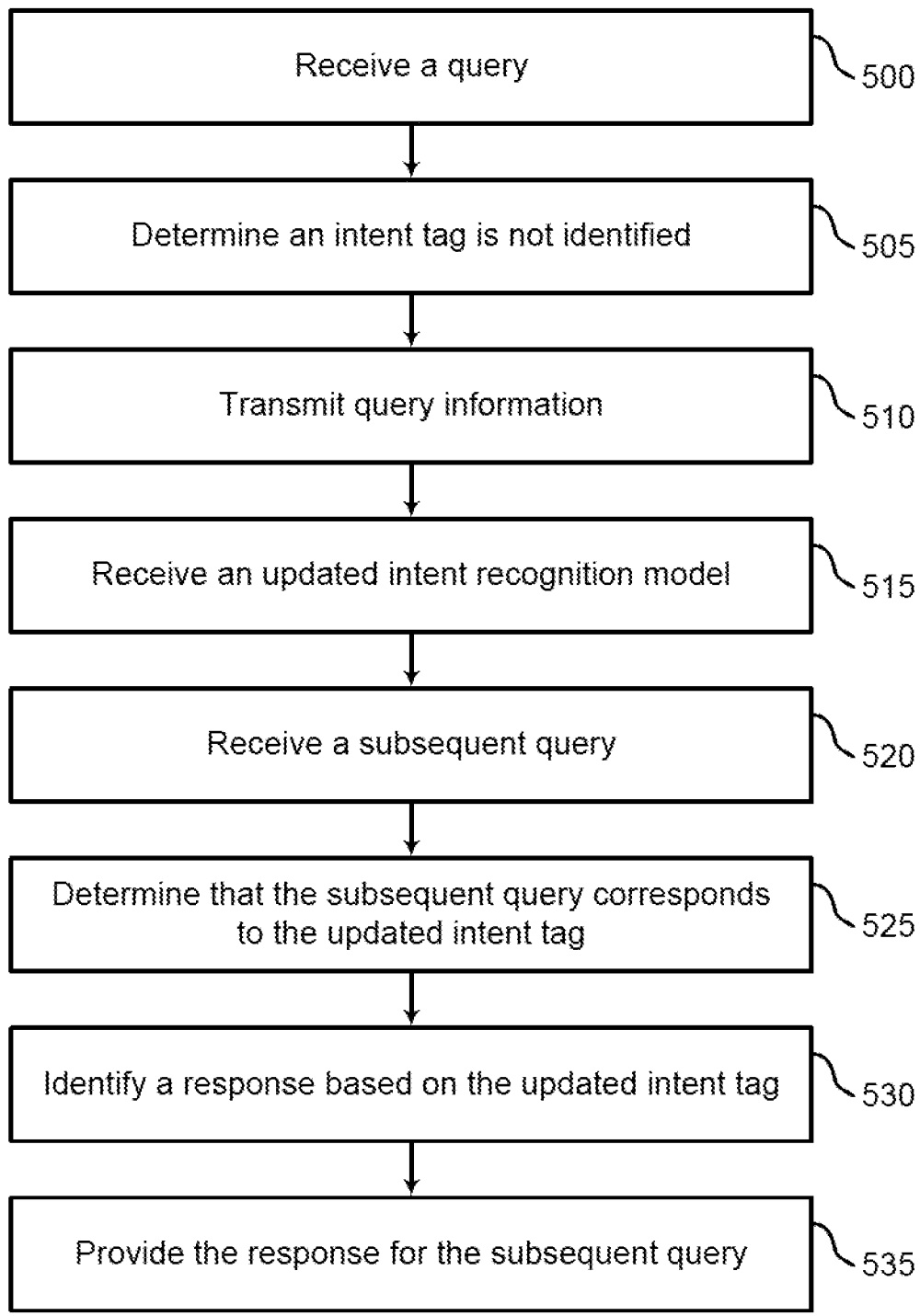
FIG. 5 shows an example of a process for extensible search, content, and dialog management according to aspects of the present disclosure.

FIG. 5 shows an example of a process for extensible search, content, and dialog management with human-in-the-loop curation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives a query. In some cases, the operations of this step refer to, or may be performed by, a question detection model as described with reference to FIGS. 4 and 9.

At operation 505, the system determines that an intent recognition model did not identify an intent tag for the query. In some cases, the operations of this step refer to, or may be performed by, an intent recognition model as described with reference to FIGS. 4, 6, and 9.

At operation 510, the system transmits query information based on the determination. In some cases, the operations of this step refer to, or may be performed by, a device as described with reference to FIGS. 1, 4, and 9.

At operation 515, the system receives an updated intent recognition model including an updated intent tag corresponding to the query. In some cases, the operations of this step refer to, or may be performed by, a device as described with reference to FIGS. 1, 4, and 9.

At operation 520, the system receives a subsequent query. In some cases, the operations of this step refer to, or may be performed by, a question detection model as described with reference to FIGS. 4 and 9.

At operation 525, the system determines that the subsequent query corresponds to the updated intent tag. In some cases, the operations of this step refer to, or may be performed by, an intent recognition model as described with reference to FIGS. 4, 6, and 9.

At operation 530, the system identifies a response based on the updated intent tag. In some cases, the operations of this step refer to, or may be performed by, a content scripting engine as described with reference to FIGS. 4 and 9.

At operation 535, the system provides the response for the subsequent query. In some cases, the operations of this step refer to, or may be performed by, a device as described with reference to FIGS. 1, 4, and 9.

Cloud Server

Figure 6:
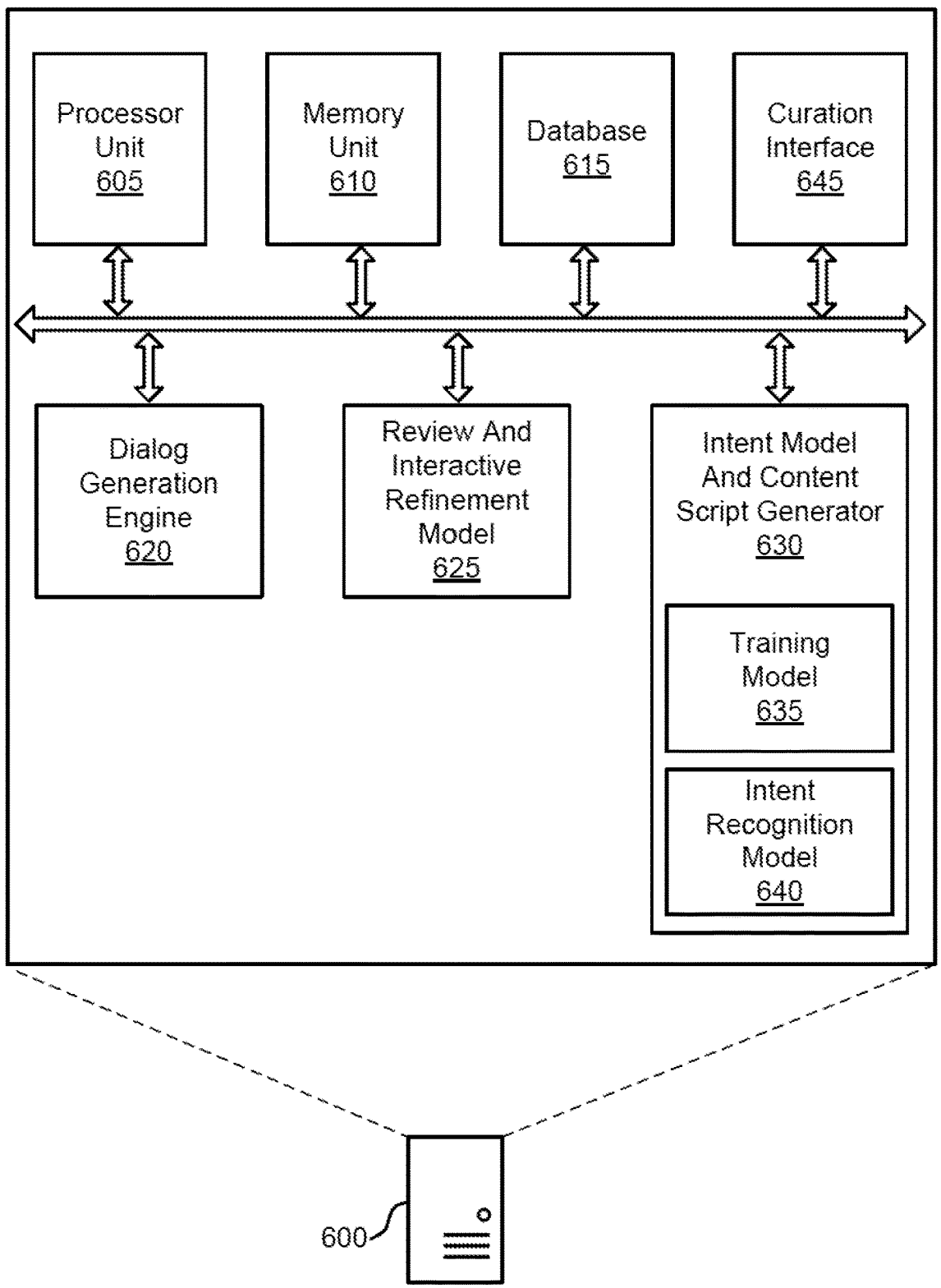
FIG. 6 shows an example of an example server according to aspects of the present disclosure.
Figure 7:
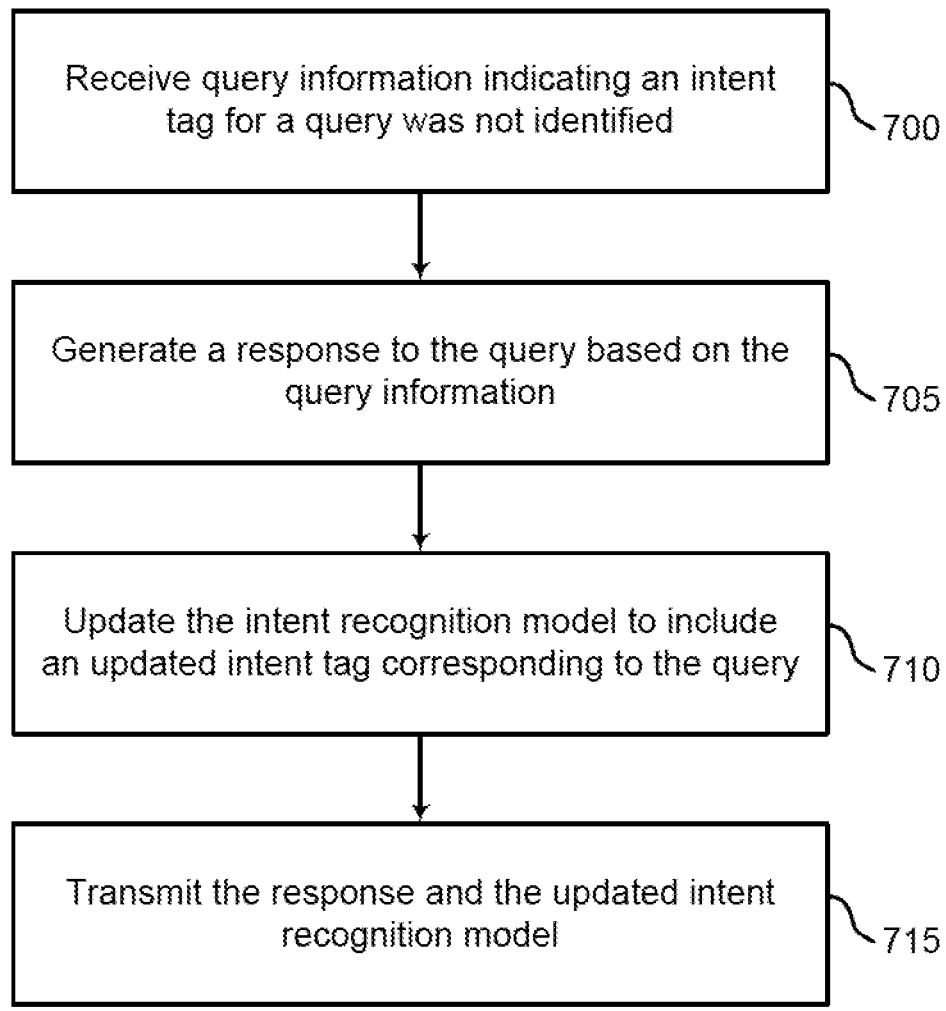
FIGS. 7 through 8 show examples of a process for extensible search, content, and dialog management according to aspects of the present disclosure.
Figure 8:
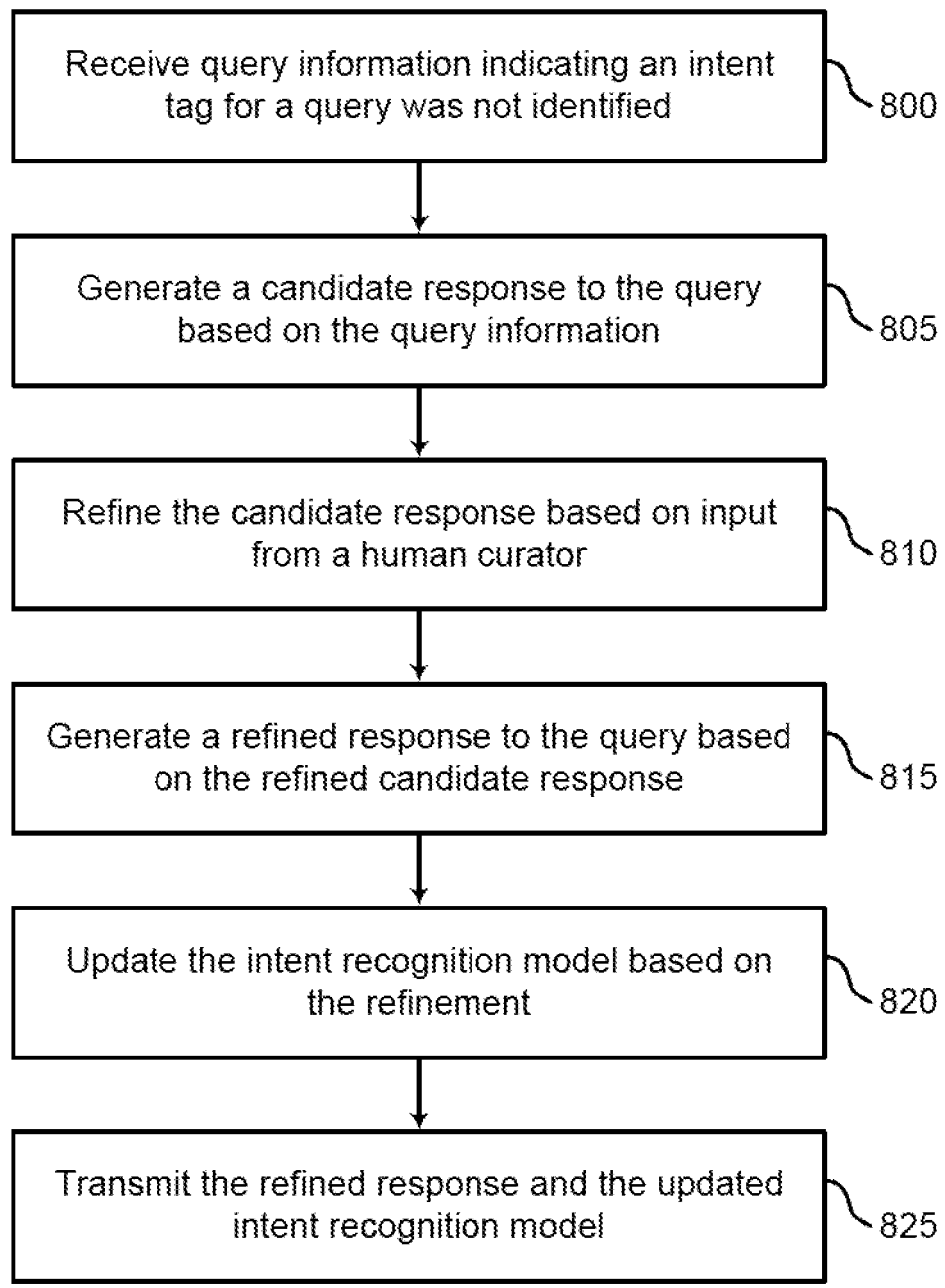

According to FIGS. 6-8, a method, apparatus, non-transitory computer readable medium, and system for extensible search, content, and dialog management are described. One or more embodiments of the method, apparatus, non-transitory computer readable medium, and system include receiving query information indicating that an intent recognition model did not identify an intent tag for a query, generating a response to the query based on the query information, updating the intent recognition model to include an updated intent tag corresponding to the query, and transmitting the response and the updated intent recognition model.

Some examples of the method, apparatus, non-transitory computer readable medium, and system described above further include generating a candidate response using a dialog generation engine. Some examples further include refining the candidate response to generate the response. In some examples, the candidate response is refined by a human curator. Some examples of the method, apparatus, non-transitory computer readable medium, and system described above further include linking an additional query with the response, wherein the intent recognition model is updated based at least in part on the additional query.

Some examples of the method, apparatus, non-transitory computer readable medium, and system described above further include receiving the query from a user. Some examples further include attempting to detect the intent tag of the query using the intent recognition model. Some examples further include determining that the intent recognition model did not identify the intent tag for the query. Some examples further include transmitting the query information based on the determination.

Some examples of the method, apparatus, non-transitory computer readable medium, and system described above further include receiving a subsequent query. Some examples further include determining, using the updated intent recognition model, that the subsequent query corresponds to the updated intent tag. Some examples of the method, apparatus, non-transitory computer readable medium, and system described above further include updating a content scripting engine based on the response.

FIG. 6 shows an example of an example server 600 according to aspects of the present disclosure. Server 600 is an example of, or includes aspects of, the corresponding element described with reference to FIGS. 1 and 9. In one embodiment, server 600 includes processor unit 605, memory unit 610, database 615, dialog generation engine 620, review and interactive refinement model 625, intent model and content script generator 630, and curation interface 645. Although the apparatus of FIG. 6 is described in the context of a server, it could also be located on a user device.

An apparatus for extensible search, content, and dialog management with human-in-the-loop curation is described. One or more embodiments of the apparatus include dialog generation engine 620 configured to receive query information and generate a response based on query information indicating that intent recognition model did not identify an intent tag for the query, a review and interactive refinement model 625 configured to generate a candidate response using a dialog generation engine and refine the candidate response, and a training model 635 configured to update the intent recognition model 640 and the content scripting engine.

Processor unit 605 is an example of, or includes aspects of, the corresponding element described with reference to FIG. 4. Memory unit 610 is an example of, or includes aspects of, the corresponding element described with reference to FIG. 4. Database 615 is an example of, or includes aspects of, the corresponding element described with reference to FIGS. 1 and 4.

According to some embodiments, dialog generation engine 620 receives query information indicating that an intent recognition model 640 did not identify an intent tag for a query. In some examples, dialog generation engine 620 generates a candidate response using a dialog generation engine 620. According to some embodiments, dialog generation engine 620 is configured to generate a response based on query information indicating that intent recognition model 640 did not identify the intent tag for the query. In some examples, the dialog generation engine 620 includes a neural network with a transformer architecture. Dialog generation engine 620 is an example of, or includes aspects of, the corresponding element described with reference to FIG. 9.

According to some embodiments, review and interactive refinement model 625 generates a response to the query based on the query information. In some examples, review and interactive refinement model 625 refines the candidate response to generate the response. In some examples, the candidate response is refined by a human curator. In some examples, review and interactive refinement model 625 links an additional query with the response, where the intent recognition model 640 is updated based on the additional query. Review and interactive refinement model 625 is an example of, or includes aspects of, the corresponding element described with reference to FIG. 9.

According to some embodiments, intent model and content script generator 630 updates the intent recognition model 640 to include an updated intent tag corresponding to the query. Intent model and content script generator 630 is an example of, or includes aspects of, the corresponding element described with reference to FIG. 9. In one embodiment, intent model and content script generator 630 includes training model 635 and intent recognition model 640. Training model 635 is an example of, or includes aspects of, the corresponding element described with reference to FIG. 4. Intent recognition model 640 is an example of, or includes aspects of, the corresponding element described with reference to FIGS. 4 and 9.

According to some embodiments, curation interface 645 is configured to refine the response generated by the dialog generation engine 620. In some examples, the curation interface 645 is configured to link additional queries to the response. Curation interface 645 is an example of, or includes aspects of, the corresponding element described with reference to FIG. 9.

In some examples, the dialog generation engine comprises a neural network with a transformer architecture. Some examples of the apparatus, system, and method described above further include a curation interface configured to refine the response generated by the dialog generation engine. In some examples, the curation interface is configured to link additional queries to the response.

In some examples, a curation interface may include one or more aspects of an input/output (IO) controller. An IO controller may manage input and output signals for a device. IO controller may also manage peripherals not integrated into a device. In some cases, an IO controller may represent a physical connection or port to an external peripheral. In some cases, an IO controller may utilize an operating system such as iOS®, ANDROID®, MS-DOS®, MS-WINDOWS®, OS/2®, UNIX®, LINUX®, or another known operating system. In other cases, an IO controller may represent or interact with a modem, a keyboard, a mouse, a touchscreen, or a similar device. In some cases, an IO controller may be implemented as part of a processor. In some cases, a user may interact with a device via IO controller or via hardware components controlled by an IO controller.

FIG. 7 shows an example of a process for extensible search, content, and dialog management with human-in-the-loop curation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives query information indicating that an intent recognition model did not identify an intent tag for a query. In some cases, the operations of this step refer to, or may be performed by, a dialog generation engine as described with reference to FIGS. 6 and 9.

At operation 705, the system generates a response to the query based on the query information. In some cases, the operations of this step refer to, or may be performed by, a review and interactive refinement model as described with reference to FIGS. 6 and 9.

At operation 710, the system updates the intent recognition model to include an updated intent tag corresponding to the query. In some cases, the operations of this step refer to, or may be performed by, an intent model and content script generator as described with reference to FIGS. 6 and 9.

At operation 715, the system transmits the response and the updated intent recognition model. In some cases, the operations of this step refer to, or may be performed by, a training model as described with reference to FIGS. 4 and 6.

FIG. 8 shows an example of a process for extensible search, content, and dialog management with human-in-the-loop curation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The present disclosure blends search results, existing dialog system response, auto-generated responses, and human response curation. The content scripting manages and updates the dialogs and content in the framework using human curators. Scalable processes are used to extend system responses automatically during run-time while ensuring minimal quality response through human curation. The present disclosure provides on-device and cloud distribution and interaction of the system to ensure a coherent experience for offline users.

At operation 800, the system receives query information indicating that a dialog manager did not recognize an intent of a query. In some cases, the operations of this step refer to, or may be performed by, a dialog generation engine as described with reference to FIGS. 6 and 9.

At operation 805, the system generates a candidate response to the query based on the query information. In some cases, the operations of this step refer to, or may be performed by, a dialog generation engine as described with reference to FIGS. 6 and 9.

At operation 810, the system refines the candidate response based on input from a human curator. In some cases, higher demand queries (e.g., queries with unidentified intent that are received in more quantity by dialog systems) may be fed to a curation team first (e.g., and once curated the curated responses, intent recognition model update information, generated content scripts, etc. may be added to the dialog management system). Such aspects, along with others, may provide for improved scalability of human curation operations. In some cases, the operations of this step refer to, or may be performed by, a review and interactive refinement model as described with reference to FIGS. 6 and 9.

At operation 815, the system generates a refined response to the query based on the refined candidate response.

At operation 820, the system updates the intent recognition model based on the refinement. In some cases, the operations of this step refer to, or may be performed by, an intent recognition model as described with reference to FIGS. 4, 6, and 9.

At operation 825, the system transmits the refined response and the updated intent recognition model. In some cases, the operations of this step refer to, or may be performed by, a training model as described with reference to FIGS. 4 and 6.

System Operation

Figure 9:
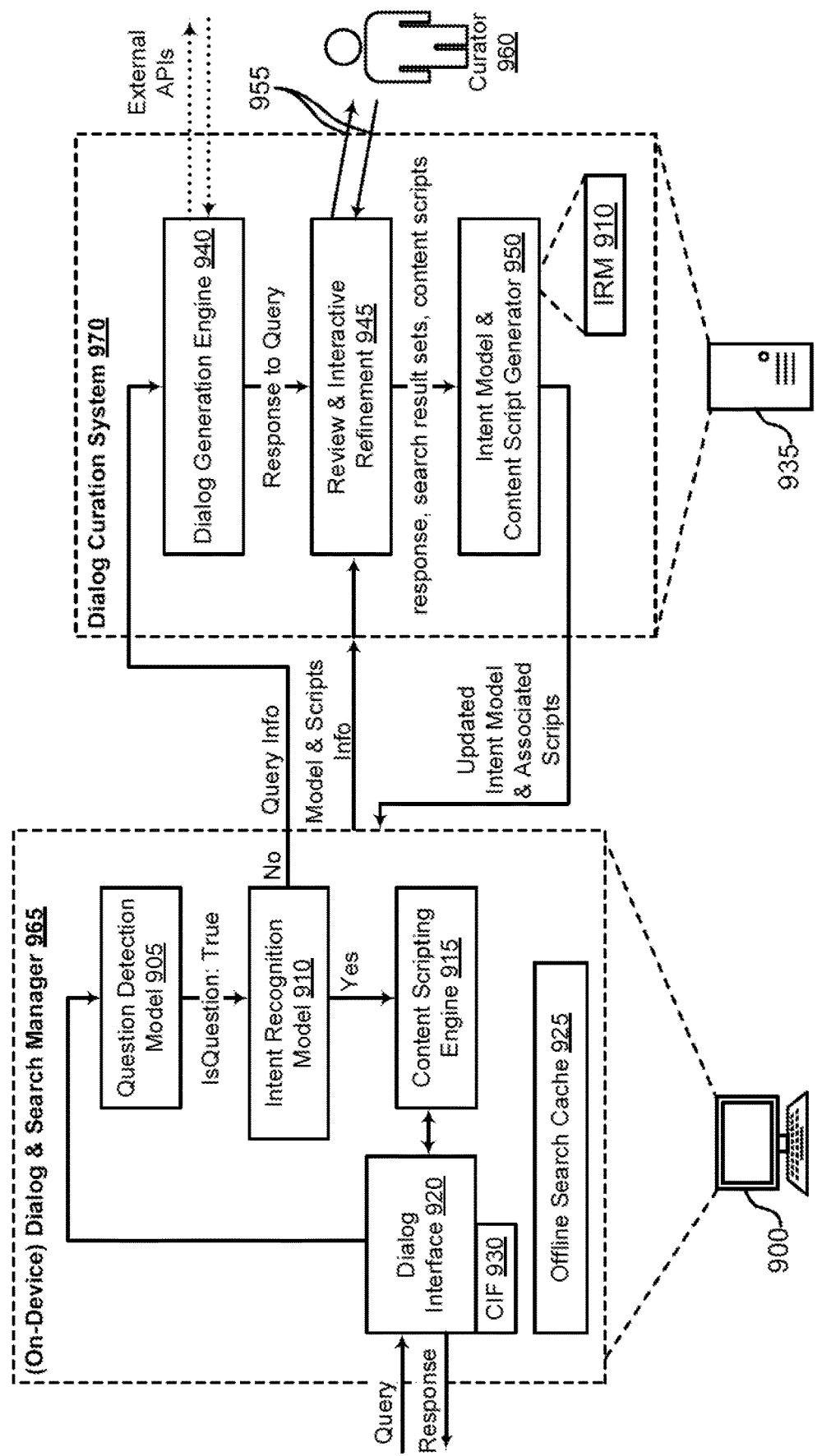
FIG. 9 shows an example of a search, content, and dialog management system according to aspects of the present disclosure.

According to FIG. 9, a system, apparatus, and method for extensible search, content, and dialog management are described. One or more embodiments of the apparatus, system, and method include an intent recognition model configured to identify an intent tag of a query, a content scripting engine configured to select response text for the query based on the intent tag, a dialog generation engine configured to generate a response based on query information indicating that intent recognition model did not identify the intent tag for the query, and a training model configured to update the intent recognition model and the content scripting engine.

In some examples, the dialog generation engine comprises a neural network with a transformer architecture. Some examples of the apparatus, system, and method described above further include a dialog interface configured to receive the query and to provide the response to a user. In some examples, the dialog interface comprises a plurality of sections corresponding to a plurality of content types. Some examples of the apparatus, system, and method described above further include a CIF component configured to provide a CIF for the query.

Some examples of the apparatus, system, and method described above further include a question detection model configured to determine whether the query comprises a question. Some examples of the apparatus, system, and method described above further include an offline search cache configured to provide offline search results based on the query. Some examples of the apparatus, system, and method described above further include a curation interface configured to refine the response generated by the dialog generation engine. In some examples, the curation interface is configured to link additional queries to the response.

FIG. 9 shows an example of a search, content, and dialog management system according to aspects of the present disclosure. The example shown includes device 900, server 935, curator 960, dialog and search manager 965, and dialog curation system 970.

The present disclosure describes systems and methods for extensible search, content, and dialog management. FIG. 9 illustrates aspects of a dialog system with an IRM 910 (e.g., a deep learning model) trained to receive and understand a natural language query from a user. A user may input a query to device 900 (e.g., via dialog interface 920) and receive a response to the input query (e.g., where the response may include content modules retrieved by the dialog and search manager 965 based on the query). As described herein, in cases where intent of a query is not identified for a received query, a dialog curation system 970 may generate one or more candidate responses that may be refined (e.g., via curator 960) to generate a curated response and update (e.g., train) the IRM 910.

For instance, dialog interface 920 may pass a user input query (e.g., a natural language text query) to question detection model 905 to determine whether the user input query is a question (e.g., or one or more search keywords). In cases the question detection model 905 determines the user input query is a question, the IRM 910 determines whether the intent of the question is recognized (e.g., whether an intent tag for the query is identified via the IRM 910).

In some examples, the intent of the user input query is recognized and the content scripting engine 915 generates dialog models specifying user interaction in response to the identified intent and associated search queries and content.

In other examples, the intent of the user input query is not recognized. In such cases, the dialog and search manager 965 may send query information, as well as model and script information (e.g., IRM 910 parameters, dialog model information, etc.), to dialog curation system 970. Dialog generation engine 940 may generate candidate responses to the user input query based on the query information. The candidate responses may then be reviewed and refined (e.g., via review and interactive refinement model 945 and curator 960). The review and interactive refinement model 945 may also determine search result sets and content scripts (e.g., based on the model and script information) based on the curation and the curated response. Accordingly, intent model and content script generator 950 may train the IRM 910 (e.g., dialog curation system 970 may pass updated intent model and associated scripts information to dialog and search manager 965).

Therefore, upon receiving a subsequent query with similar intent, the dialog and search manager 965 may identify the intent for the subsequent query using the updated IRM 910. Embodiments of the present disclosure further manage dialog based on natural language conversation and generate natural language responses (e.g., using determined intent of natural language queries).

The present disclosure enables a user-facing functionality where searches in the form of keywords and questions may be run (e.g., searching edit photos surfaces tools, help and tutorials for a topic). However, once a query with a known intent is detected, the system provides an answer while surfacing curated search results. If a query is recognized as a question with unknown intent (i.e., no answer is available instantly) the software provides no results. However, the system learns and semi-automatically curates an answer to the unknown query. In case the same query is asked again, the system surfaces the answer and curated results for the query. Search results in response to a query may be curated and specific content may be shown.

The content scripting engine 915 specifies the dialog, details of the content items, and search queries to run in response to user questions. The present disclosure comprises a dialog and search manager 965 which may be a part of software (e.g., Discover Panel) and runs on a user device 900 (e.g., on a desktop). A dialog curation system 970 runs in cloud and interfaces with one or more human curators 960. The dialog curation system 970 may determine and generate intent and content scripts that are bundled (for example, with the Discover Panel). Search services (i.e., USS) are present in cloud to provide raw search results that are leveraged by the dialog and search manager 965.

When a query submitted by a user is received in the dialog and search manager 965 (i.e., UI Orchestrator component of the manager), user context is given using an intelligent framework (e.g., CIF depicted as a small box linked to UI Orchestrator). The component parallelizes the processing by sending the query to question detection and to offline search caching and search services. A query is processed by a trained machine learning model (e.g., question detection model 905) which is run on the text of a query for classification (i.e., whether a question is True or False). In some embodiments, an ensemble learning method (e.g., random forest classifier) is trained on labelled chat data corpus which is vectorized using common algorithms (e.g., TF-IDF). The accuracy of the method can be verified on a test set (obtained precision, recall and F-score are 0.93, 0.85 and 0.89). Question words and symbols (e.g., what, isn't, ?, etc.) are used to reduce false positives and increase true positives. Once a trained machine learning model (e.g., question detection model 905) is run, if a query is detected as a question, intent recognition on the question is run using an IRM 910.

In some embodiments, an IRM 910 is trained using a conversational machine learning framework (e.g., RASA®). An initial intent or question list is used to train the IRM 910 which provides for specifying a probability threshold for a known intent to be present in a query. However, if the threshold is not met, the IRM 910 may not recognize the intent of the query. If an intent is recognized (e.g., the query represents a question with a known answer or response) a scripting engine (e.g., content scripting engine 915) is run to generate a response from existing content scripts. A content script comprises dialog models specifying interaction with users in response to a specific intent and associated search queries and content. If users ask a functionality related query (e.g., a query on a crop function in Photoshop), the content scripting engine 915 includes the answer and indicates the activation steps. The script also points to the particular aspect (e.g., crop) by activating coach mark, specific content items and search queries to show behind the response.

In some embodiments, the core dialog model of a conversational machine learning framework is extended. A dialog model comprises conversational pathways, utterances in the pathways, and actual textual responses. The dialog engine of a machine learning framework generates responses to a given query of recognized intent. The model covers content, search queries, and dialog and scripts for actions in a software (e.g., Photoshop). The content script to execute is sent back to a dialog interface 920 component (e.g., UI Orchestrator). The component sends the query to an offline search caching component (e.g., offline search cache 925). The component (pre-)caches search on device 900 and looks up curated result sets before a query is sent to the actual search service (i.e., USS). If no curated result set is present for a query, and there is no precached result found in the offline search cache 925, the search service is called. The results obtained for a query are stored in a cached result set before returning them to a component (e.g., UI Orchestrator dialog interface 920). The component (i.e., UI Orchestrator dialog interface 920) combines the returned dialog response and the curated, cached, retrieved search result sets into one response that is rendered in the framework panel. If the intent is not recognized, the query is sent to a dialog curation system 970 (present in cloud) along with the information on presently used intent and dialog models and curated result sets.

For dialog curation, an automatic response to a query is generated. Dialog curation may also leverage external programming interfaces (e.g., application programming interface (API)—knowledge bases such as WolframAlpha®). The embodiments of the present disclosure leverage an autoregressive language model (e.g., Generative Pre-trained Transformer 3 (GPT-3)) that uses deep learning to produce human-like text. The self-supervised machine learning algorithm was trained on textual data to generate responses to different types of questions. However, the quality of the responses varies. Conversational responses may not be seen when queries are recognized as search. When queries are known with a recognized intent, the associated content script is retrieved and executed (e.g., a textual response). Some queries may be sent to a language model (e.g., GPT-3 algorithm) for automatic generation of a response (based on data corpus).

The responses generated are sent for review and interactive refinement. For example, a human curator 960 reviews the query and generated response for modification, rewriting, and augmenting with content and scripting (e.g., by adding coach marks). Human curators 960 may add search result sets that are associated to the query, i.e., curated search result sets are used instead of running the query directly against the search service. Curated search result set definition may comprise actual search result items, ordering, and a list of search terms to be run against the search service including specifications of the blended search service results and curated items. A new intent and dialog model is trained using the curated query response and search result sets (e.g., via the intent model and content script generator 950).

According to aspects of the described techniques, a new query and curated answer is added to the machine learning framework (i.e., RASA) intent and content scripting files. For example, RASA Core and RASA NLU are retrained resulting in a new IRM 910 and content scripts. The updated IRM 910, content scripts and curated result sets are sent back to the dialog and search manager 965 (on device 900). The communication between dialog and search manager 965 and dialog curation system 970 may be synchronous or asynchronous. Embodiments of the present disclosure use backend services (e.g., Sophia) for asynchronous communication of parameters and models. A component (i.e., UI Orchestrator) receives updated intent, content scripts, and curated result sets and replaces the models on the device 900 with new ones (e.g., with updated intent recognition models 910).

Device 900 is an example of, or includes aspects of, the corresponding element described with reference to FIGS. 1 and 4. In one embodiment, device 900 includes question detection model 905, IRM 910, content scripting engine 915, dialog interface 920, offline search cache 925, and CIF component 930. Question detection model 905 is an example of, or includes aspects of, the corresponding element described with reference to FIG. 4. IRM 910 is an example of, or includes aspects of, the corresponding element described with reference to FIGS. 4 and 6. Content scripting engine 915 is an example of, or includes aspects of, the corresponding element described with reference to FIG. 4. Dialog interface 920 is an example of, or includes aspects of, the corresponding element described with reference to FIG. 4. Offline search cache 925 is an example of, or includes aspects of, the corresponding element described with reference to FIG. 4.

According to some embodiments, CIF component 930 identifies a CIF for the subsequent query, where the response is based on the CIF. According to some embodiments, CIF component 930 is configured to provide a CIF for the query.

Server 935 is an example of, or includes aspects of, the corresponding element described with reference to FIGS. 1 and 6. In one embodiment, server 935 includes dialog generation engine 940, review and interactive refinement model 945, intent model and content script generator 950, and curation interface 955. Dialog generation engine 940 is an example of, or includes aspects of, the corresponding element described with reference to FIG. 6. Review and interactive refinement model 945 is an example of, or includes aspects of, the corresponding element described with reference to FIG. 6. Intent model and content script generator 950 is an example of, or includes aspects of, the corresponding element described with reference to FIG. 6. In one embodiment, intent model and content script generator 950 includes intent recognition model (IRM) 910. IRM 910 is an example of, or includes aspects of, the corresponding element described with reference to FIGS. 4 and 6. Curation interface 955 is an example of, or includes aspects of, the corresponding element described with reference to FIG. 6.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for dialog and search management, comprising:
   receiving, via a dialog interface on a user device, a query from a user interaction;
   determining, at a search management system operating on the user device, that an intent recognition model did not identify an intent tag for the query, wherein the intent recognition model is not trained to recognize the intent tag;
   transmitting, by the search management system to a dialog curation system operating on a cloud server, query information indicating the determination to the dialog curation system;
   receiving, by the search management system from the dialog curation system in response to transmitting the query information, an updated intent recognition model trained to recognize the intent tag;
   replacing, by the search management system, the intent recognition model with the updated intent recognition model received from the dialog curation system;
   receiving, via the dialog interface, a subsequent query from a subsequent user interaction;
   determining, using the updated intent recognition model, that the subsequent query corresponds to the intent tag;
   generating a response based on the intent tag; and
   providing, to the dialog interface, the response for the subsequent query.

2. The method of claim 1, further comprising:
   determining that the query comprises a question.

3. The method of claim 1, further comprising:
   identifying a contextual intelligence framework (CIF) for the subsequent query, wherein the response is based at least in part on the CIF.

4. The method of claim 1, further comprising:
transmitting the subsequent query to an offline search cache; and
receiving cached results for the subsequent query from the offline search cache, wherein the response is based at least in part on the cached results.

5. The method of claim 1, further comprising:
responding that an answer to the query is unknown.

6. A method for dialog curation, comprising:
receiving, by a dialog curation system operating on a cloud server from a search management system operating on a user device, query information indicating that an intent recognition model did not identify an intent tag for a query, wherein the intent recognition model is not trained to recognize the intent tag;
generating a response to the query based on the query information;
updating the intent recognition model to include the intent tag corresponding to the query using a training model, wherein the updated intent recognition model is trained to recognize the intent tag;
replacing, by the search management system, the intent recognition model with the updated intent recognition model received from the dialog curation system; and
transmitting the response and the updated intent recognition model from the dialog curation system to the search management system.

7. The method of claim 6, further comprising:
generating a candidate response using a dialog generation engine; and
refining the candidate response to generate the response.

8. The method of claim 7, wherein:
the candidate response is refined by a human curator.

9. The method of claim 6, further comprising:
linking an additional query with the response, wherein the intent recognition model is updated based at least in part on the additional query.

10. The method of claim 6, further comprising:
receiving the query from the search management system, wherein the search management system receives the query from a user interaction and transmitting the query information to the dialog curation system after attempting to detect the intent tag of the query using the intent recognition model and determining that the intent recognition model did not identify the intent tag for the query.

11. The method of claim 6, further comprising:
receiving a subsequent query; and
determining, using the updated intent recognition model, that the subsequent query corresponds to the updated intent tag.

12. The method of claim 6, further comprising:
updating a content scripting engine based on the response.

13. A system for dialog management, comprising:
one or more processors; and
one or more memories including instructions executable by the one or more processors to:
generate, by a dialog generation engine on a dialog curation system operating on a cloud server, a response based on query information received from a search management system operating on a user device, wherein the query information indicates that an intent recognition model did not identify an intent tag for a query, and wherein the intent recognition model is not trained to recognize the intent tag; and
update, by a training model, the intent recognition model and a content scripting engine, wherein the updated intent recognition model is trained to recognize the intent tag;
replacing, by the search management system operating on the user device, the intent recognition model with the updated intent recognition model received from the dialog curation system.

14. The system of claim 13, wherein:
the dialog generation engine comprises a neural network with a transformer architecture.

15. The system of claim 13, wherein the one or more memories further including instructions executable by the one or more processors to receive, via a dialog interface, the query and to provide the response to a user.

16. The system of claim 15, wherein:
the dialog interface comprises a plurality of sections corresponding to a plurality of content types.

17. The system of claim 13, wherein the one or more memories further including instructions executable by the one or more processors to provide a contextual intelligence framework (CIF) for the query by a CIF component.

18. The system of claim 13, wherein the one or more memories further including instructions executable by the one or more processors to determine whether the query comprises a question by a question detection model.

19. The system of claim 13, wherein the one or more memories further including instructions executable by the one or more processors to provide offline search results based on the query by an offline search cache.

20. The system of claim 13, wherein the one or more memories further including instructions executable by the one or more processors to refine the response generated by the dialog generation engine by a curation interface.

* * * * *